Aug. 10, 1965  C. E. PALMER  3,199,670
CONTAINER
Filed April 30, 1962  3 Sheets-Sheet 2

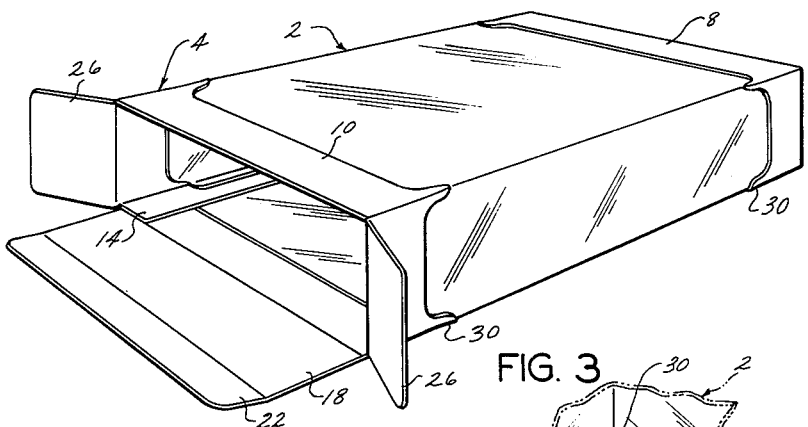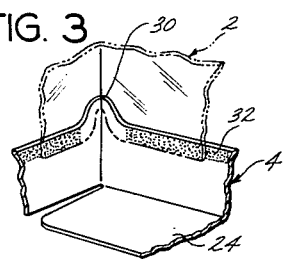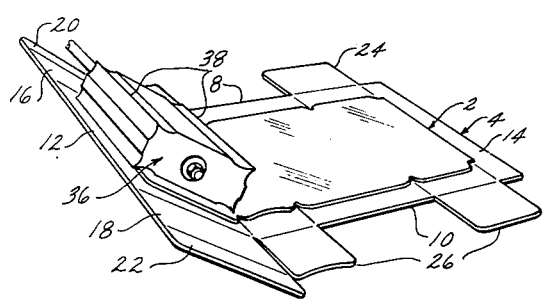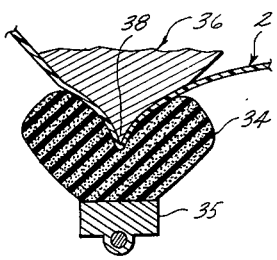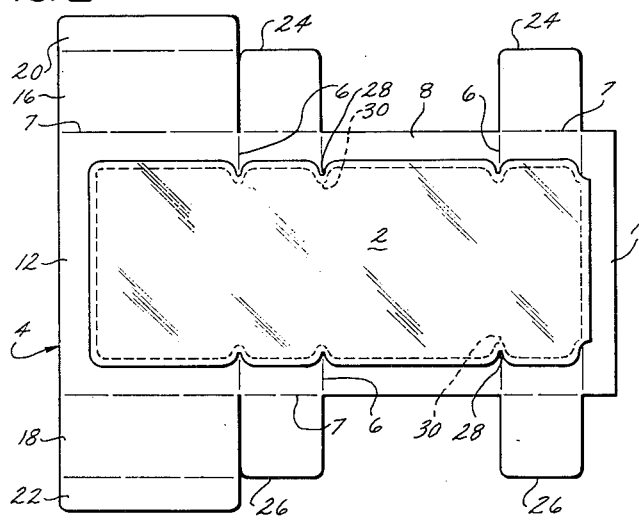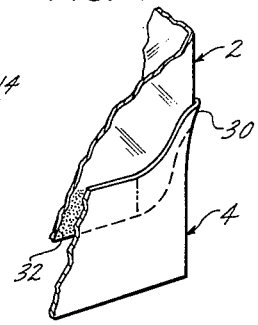

INVENTOR.
CHARLES E. PALMER
BY
ATTORNEY

Aug. 10, 1965     C. E. PALMER     3,199,670
CONTAINER
Filed April 30, 1962     3 Sheets-Sheet 3

*INVENTOR.*
CHARLES E. PALMER
BY
ATTORNEY

United States Patent Office 3,199,670
Patented Aug. 10, 1965

3,199,670
CONTAINER
Charles E. Palmer, Somers, Conn., assignor to Monsanto Company, St. Louis, Mo., a corporation of Delaware
Filed Apr. 30, 1962, Ser. No. 191,018
17 Claims. (Cl. 206—45.34)

The present invention relates to window containers, and more particularly, to a novel container formed of paperboard sheet material and semi-rigid synthetic plastic sheeting, and to the blank therefor.

Paperboard containers having windows of transparent plastic sheet material are widely employed for displaying the contents to the purchaser and for achieving optimum aesthetic qualities. Generally, the bulk of these containers have utilized windows of thin, highly flexible film which have been relatively small to maintain sufficient strength in the package. Although some window containers have been made with a heavier gauge plastic material in one side thereof, heretofore it has not been considered feasible to provide a container in which the window not only extended about the folded corner of the container but was of sufficient rigidity to contribute significantly to the strength of the assembly.

It is an aim of the present invention to provide a novel display window container having a folded window of transparent synthetic plastic material extending about a corner of the container and in which the window has sufficient strength to resist impacts upon it during normal usage and contributes to the overall strength of the assembly to provide a relatively rigid, high-strength container of highly attractive appearance.

Another aim is to provide a blank of paperboard and semi-rigid synthetic plastic sheet material which may be readily cold folded at high speeds to provide a relatively high-strength display container having a folded window extending about an edge thereof.

Other objects and advantages will be apparent from the following detailed description and claims and the attached drawings wherein:

FIG. 1 is a perspective view of a container embodying the present invention with an end thereof opened so as to reveal internal construction;

FIG. 2 is a plan view to a reduced scale of the blank for the container of FIG. 1;

FIG. 3 is a fragmentary perspective view looking at the inside of a corner of the container of FIG. 1;

FIG. 4 is a fragmentary perspective view looking at the outside of a corner of the container of FIG. 1;

FIG. 5 is a perspective view of the folding die and blank during the folding operation;

FIG. 6 is a fragmentary sectional view normal to the line of fold diagrammatically illustrating the folding operation;

Figure 8:
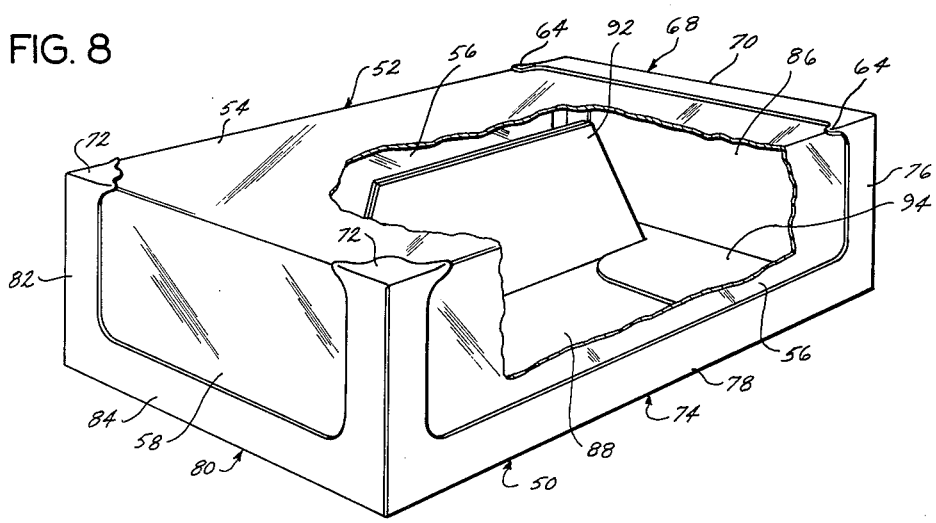
FIG. 8 is a perspective view of another container embodying the invention.

I have now found that the foregoing and related objects may be readily attained in a container formed of a frame of paperboard plastic material and a window of semi-rigid, synthetic plastic sheet material with a substantially rectilinear fold therein and having the frame overlapping opposed side margins of the window normal to the direction of the fold therein. The window has notches at its side margins at the ends of the fold and the paperboard frame has projecting finger portions on each of its overlapping margins extending towards each other beyond the margins of the notches to conceal the same from external view. The paperboard frame and window are secured together by an interposed adhesive which terminates adjacent the notches and projecting finger portions so that the overlapping surfaces of the finger portions and window adjacent the notches are free from adhesive to permit relative slippage therebetween.

In this manner, the thickness of the plastic sheet material at the folds is accommodated by displacing the plastic sheet material from the body portion of the frame at the fold lines through the notches and allowing the projecting finger portions of the frame to bend outwardly about the folds in the window. In this manner, relatively thick plastic sheeting may be readily folded without excessive stress upon the paperboard at the folds to form an attractive package.

In folding the containers of the present invention, a blank is utilized which has a window of semi-rigid synthetic plastic sheet material, the surface of which is smooth and unbroken. The paperboard frame overlaps at least two opposed side margins of the window and has weakening or score lines defining the folds to be made in forming the container. The plastic window has notches at its overlapped side margins aligned with the weakening lines and the frame has projecting finger portions which extend in overlapping relationship beyond the margins of the notches so as to conceal one surface thereof, and the finger portions and the surface of the window overlapped thereby are free from adhesive. The blank is supported between a die pad of resiliently deformable material and a rigid folding blade with the paperboard side adjacent the die pad which extends along the line of the projected fold and terminates adjacent to but short of the inner ends of the projecting finger portions. The folding blade and window are then pressed into the die pad sufficiently to cause the deformable material of the die pad to flow and fold the window about the blade to establish a permanent fold therein while permitting the finger portions to deflect outwardly and accommodate the thickness of the window at the fold.

Referring now to the drawings in detail, there are illustrated several containers embodying the present invention. Turning first to the embodiment of FIGS. 1–4, a six-sided container is illustrated therein as formed from a folded plastic window generally designated by the numeral 2 and a frame of paperboard sheet material generally designated by the numeral 4. As best seen in FIG. 2, the paperboard frame 4 is integrally formed and is provided with score lines 6 and cut so as to provide a generally rectangular body with a generally rectangular aperture defined by top and bottom side wall portions numbered 8 and 10, respectively, connected by the end strap portions 12, 14. The end wall flaps 16, 18 with their tongue portions 20, 22 and the side flaps 24, 26 are hingedly connected to the body at the fold or score lines 7 and provide the end closures for the carton upon assembly.

The window 2 is generally rectangular in configuration and is dimensioned so that the opposed side margins of the side wall portions 8, 10 and the strap portions 12, 14 overlap the side margins thereof. As can be seen in FIG. 2, the window 2 is free from score or other weakening lines so that its surface is smooth and unbroken.

At each of the fold lines 6 in the body of the frame 4, the window 2 is provided with curvilinear notches 28 which are of greater depth than the overlapping portion of the top and bottom wall portions 10, 12. The bottom and top wall portions 10, 12 have generally curvilinear projecting fingers 30 extending towards each other and overlapping the surface of the window 2 about the margins of the notches 28.

As best seen in FIGS. 3 and 4, interposed between and bonding the overlapping linear portions of the window 2 and the bottom, top and end strap portions 8, 10, 12, 14 is an adhesive layer 32 which is substantially continuous between the fingers 30 but which terminates adjacent thereto so that the overlapping surfaces of the fingers 30 and the window 2 adjacent the margins of the notches 28 are free from adhesive to permit slippage therebetween.

When the blank is folded into the assembled container, additional adhesive (not shown) between the overlapping end strap portions 12, 14 bonds the two surfaces and secures the assembly.

As best seen in FIGS. 3 and 4, the notches 28 displace the folds formed in the window 2 inwardly from the body or lineal edges of the top and bottom wall portions 8, 10 but are concealed from external view by the projecting fingers 30 which overlap the margins thereof. Thus the excess material of the folds in the plastic is displaced from the relatively rigid body of the frame so as to permit unencumbered folding of the window. As shown in FIG. 4, the projecting paperboard fingers 30 are relatively weak since they are unsupported at their sides and deflect or bend outwardly quite readily under the stress created by the thickness of the window at the folds. Thus, the window folds easily since the folded portion is free to spring somewhat outwardly of the inner surface of the body of the frame without substantial confinement.

Figure 7:
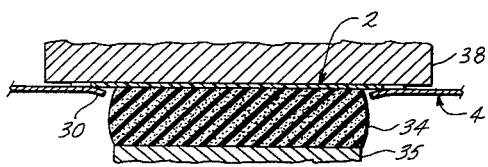
FIG. 7 is a fragmentary sectional view along the line of fold diagrammatically illustrating the folding operation.

The method of folding the blank is diagrammatically illustrated in FIGS. 5–7 and generally utilizes the principle of cold-folding synthetic plastic sheet material disclosed and claimed in my United States Patent No. 2,954,725, issued October 4, 1960, and entitled Method and Apparatus for Folding Plastic Sheet Stock.

In the folding operation, the window 2 of the blank is supported between a die pad 34 of resiliently deformable material such as rubber and a folding mandrel 36 which has undercut edges providing a plurality of folding blade edges 38. Although a single die pad may be utilized, a series (not shown) of die pads 34 pivotally mounted upon rocker supports 35 and located at each intended fold is preferably employed for optimum and facile operation. The mandrel 36 conveniently rotates across the surface of the blank making the fold and pivoting about each fold with the blank and die pad following the mandrel until disengaged by the further rotation thereof. The mandrel 36 is dimensioned so that its side, top and bottom surfaces equal the distance between the intended folds in the blank, thus enabling all folds to be made by a single mandrel.

As best seen in FIG. 7, the resilient die pad 34 extends along the line of the projected fold and terminates adjacent to but spaced inwardly from the inner ends of the projecting fingers 30. As best seen in FIG. 6, during the folding operation the window 2 and the folding blade 38 are pressed down into the resiliently deformable material of the die pad 34 and the material of the die pad flows to fold the window about the blade edge 38 of the mandrel 36 and into the undercut portions thereof. Since the plastic sheet material is thus folded to an angle greater than 90 degrees, and preferably about 120 degrees, the window will generally set at about 90 degrees after folding, the inherent tendency of the plastic sheet to relax having been overcome. Although the portions of the plastic window overlapped by the fingers 30 are not depressed into the die pad material, it has been found that the stressing and setting of the plastic sheet extends somewhat beyond the edges of the die pad and that the relatively insignificant distance which is not well folded does not interfere with the major length of the fold.

As best seen in FIG. 7, the fingers 30 are not restricted by the die pad 34 and bow or deflect downwardly to accommodate the thickness of the plastic material at the fold. The mandrel 36 and its folding blade edges 38 desirably extend along the entire fold line 7 to provide a surface about which the paperboard frame may fold.

By use of the blank and method of cold-folding of the present invention, the containers may be rapidly formed in high-speed equipment on automatic packaging lines. The cardboard frames are scored or weakened along the fold lines prior to assembly with the plastic window and thus fold readily at the time of folding of the plastic window. Since no heat is needed, the folding operation can proceed extremely rapidly without damage to the finish of the paperboard frame.

Figure 9:
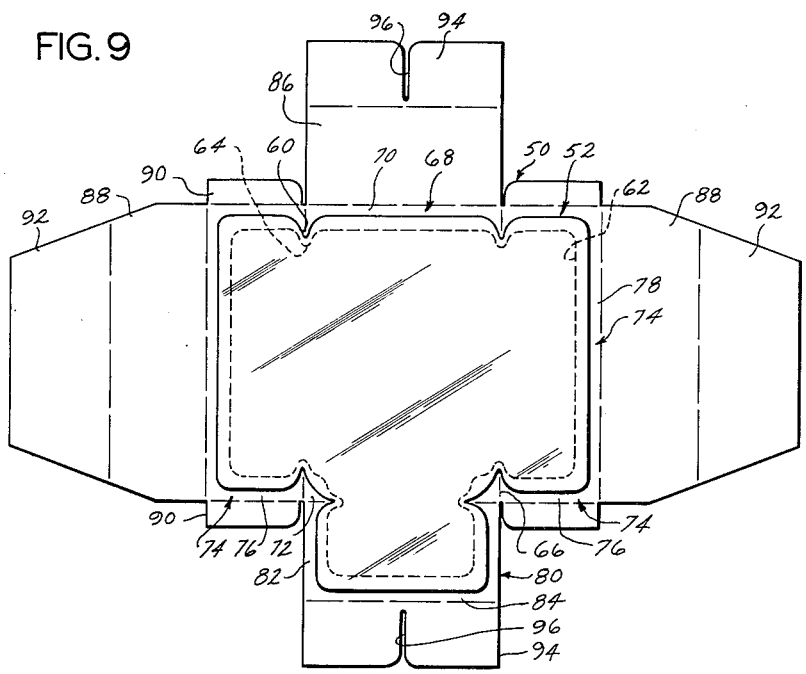
FIG. 9 is a plan view to a reduced scale of the blank for the container of FIG. 8.

Turning now to the embodiment of FIGS. 8 and 9, a container which may be used either as a compartmented unit or as a pedestal display unit for goods such as caps or hats is therein illustrated. The paperboard frame is generally designated by the numeral 50 and the plastic window is generally designated by the numeral 52. As best seen in FIG. 9, the plastic sheet material of the window 52 is generally T-shaped in the blank and is folded to provide a top panel 54, side wall panels 56, and a front panel 58. Curvilinear notches 60 are similarly provided at the side margins of each of the intended folds therein.

The paperboard frame 50 is generally cross-shaped and has a generally T-shaped aperture 52 therein configured and dimensioned to conform generally to the periphery of the window 52 and to overlap the side margins thereof with projecting fingers 64 overlapping the surface of the window at the margins of the notches. The frame 50 is provided with score or weakening lines 66 and is cut so as to provide a top panel 68 having the strap portion across one end thereof 70 and the corner tabs 72 at the corners of the other end, the generally U-shaped side wall panels 74 with their column portions 76 at the ends thereof hinged at the top to the corner tabs 72 and connected at their base by the base strap 78, the similarly configured generally U-shaped front panel 80 with its columnar portions 82 at its ends hinged at the top to the corner tabs 72 and connected at the base by the strap portion 84, and the unapertured rear panel 86.

The bottom wall panels 88 are hingedly connected to the outer or bottom margins of the side wall panels 74, and the upright panels 92 in turn are hingedly connected thereto. End flaps 90 are connected to the side edges of the side wall panels 74. Hingedly connected to the outer or bottom margins of the front and rear panels 80, 86 are the locking panels 94 having elongate notches 96 in the center thereof which are dimensioned to closely receive the width of the divider panels 92 and provide frictional engagement therebetween to maintain the container in assembly while permitting facile disassembly.

As in the embodiment of FIGS. 1–4, the window 52 and frame 50 are bonded together by adhesive (not shown) in the overlapping areas between the fingers 64, and the overlapping surfaces of the fingers and window 52 adjacent the notches 60 are free from adhesive to permit relative slippage and free bowing of the fingers 64 to accommodate the thickness of the fold.

As best seen in FIG. 9, the adjacent notches 60 at the corner tabs 72 provided to accommodate the folds between the top panel 54 and the side wall panels 56 and between the top panel 54 and the front panel 58 blend into each other. The corner tabs 72 provide fingers 64 overlapping both notches 60 and the columnar portions 76, 82 supporting the tabs 72 reinforce the edges of the container while also providing a portion of the fingers 64.

Figure 10:
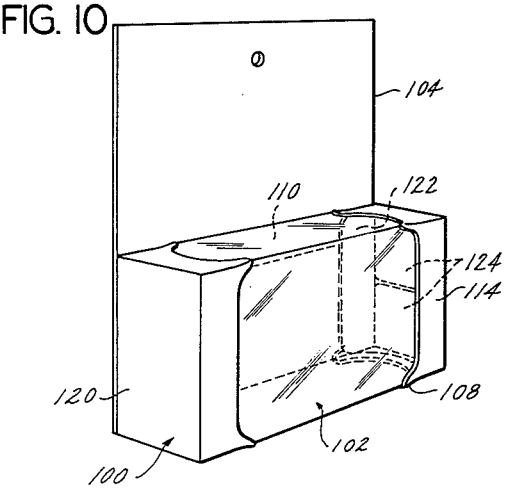
FIG. 10 is a perspective view of still another embodiment of the invention.
Figure 11:
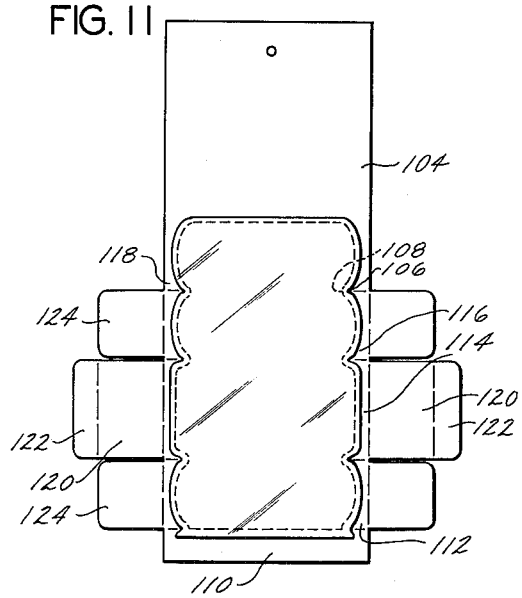
FIG. 11 is a plan view to a reduced scale of the blank for the container of FIG. 10.

Referring now to the embodiment of FIGS. 10 and 11, a hanging display container is therein illustrated as comprised of a paperboard frame 100, a plastic window 102 and a hanging card portion 104 which is integrally formed with the frame 100. The window 102 is generally rectangular in configuration and is provided with notches 106 at the intended folds. The paperboard frame 100 is provided with a generally rectangular aperture dimensioned so that the paperboard will overlap the margins of the window 102 and has projecting fingers 108 overlapping the surface of the window adjacent the margins of the notches 106. Weakening or score lines define the strap 110, the top, front, and bottom wall panels 112, 114, 116 and the rear wall panel 118 which is elongated to provide the outwardly extending hanging card portion 104. Cuts and score lines define the end wall flaps 120 with their insert tongue portions 122 and side flaps 124 to provide the end closures for the container. Upon folding, the strap 110 is secured to the inner surface of the rear wall panel 118.

Figure 12:
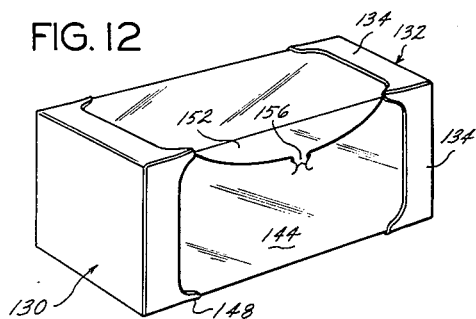
FIG. 12 is a perspective view of a further embodiment of the invention.
Figure 14:
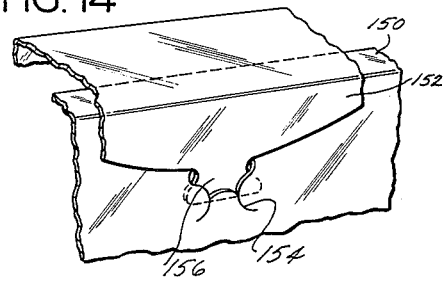
FIG. 14 is an enlarged fragmentary perspective view of the lock in the container of FIG. 12.
Figure 13:
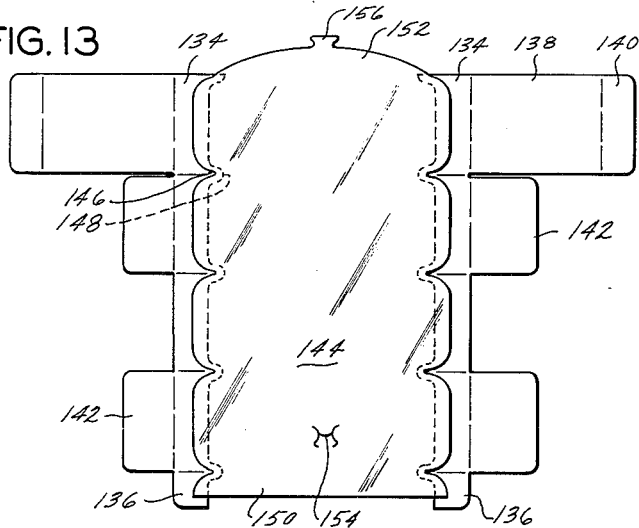
FIG. 13 is a plan view to a reduced scale of the blank for the container of FIG. 12.

In the embodiment of FIGS. 12–14, the paperboard frame is comprised of two separate caps 130, 132, each of which is cut and provided with score lines which define the four side wall panels 134, overlapping tabs 136, end wall flaps 138 with their insert tongue portions 140, and side flaps 142. The plastic window 144 has notches 146 at the fold or score lines defining the wall panels 134 and the side wall panels 134 of the caps 130, 132 have projecting fingers 148 overlapping the surface of the window adjacent the margins of the notches 146.

Due to the width between the cap portions 130, 132 of the frame, the overlapping ends of plastic window 144 are secured together to increase the strength. In the illustrated container, the window 144 is formed with an inner flap 150 bonded to the overlapping tabs 136 and a locking flap 152 which overlies a side wall panel having a lock incision 154 therein for receiving the locking tongue 156 on the locking flap 154. Upon assembly, the overlapping tabs 136 of the caps 130, 132 are adhesively bonded to the adjacent surfaces of the caps and the tongue 156 is engaged in the incision 154. The window 144 and caps 130, 132 of the frame are bonded by adhesive along the overlapping side margins, but the fingers 148 and surface of the windows adjacent the notches 146 are free from adhesive.

In each of the several illustrated embodiments, the frame of paperboard material overlaps at least two side margins of the window, and the window has notches at the folds which are covered by projecting fingers on the frame which overlap the surface of the window adjacent the notches. Adhesive is interposed between and bonds the overlapping portions of the window and frame but terminates adjacent the projecting fingers and notches so that the excess material of the window at the fold is displaced from the body of the frame and the fingers are free to bow outwardly to accommodate the fold in the window. The frame can be merely caps at the ends of the window or it can include columnar portions, straps or walls extending between the ends. When merely caps are employed and there is a significant width therebetween, increased strength may be provided by securing overlying portions of the plastic material by mechanical locks, adhesives, heat sealing or other suitable means.

The paperboard material for the frame should be relatively rigid to provide optimum strength and generally a thickness of 12 to 50 mils has proven satisfactory for most purposes, although heavier corrugated stock may be used in some applications. Since the paperboard may be dyed or printed readily, wide variations in appearance of the container are possible.

The synthetic plastic sheet material employed for the window should be semi-rigid with sufficient flexibility to accommodate stresses and impacts occurring during normal usage. The material also should have the characteristics of being foldable in accordance with the method of my aforementioned patent and of substantially retaining a fold made therein. From the standpoint of optimum aesthetic qualities and visibility, the plastic sheeting should be clear and relatively resistant to scratching during normal usage.

Exemplary of the various synthetic plastic sheetings which may be employed are biaxially oriented polystyrene, cellulose acetate, cellulose acetate butyrate, polyvinyl chloride-acetate copolymer, polyethylene and polypropylene. As a specific example of a highly advantageous material, biaxially oriented polystyrene of 5 to 15 mils has been particularly effective because of its clarity, high strength and semi-rigidity coupled with sufficient resiliency and flexibility to provide durable folds and resistance to normal impacts.

As can be readily appreciated, the present invention provides a display container with an integrally formed window portion of semi-rigid plastic sheeting which may be folded to provide transparent portions in a plurality of sides of the container and wherein the window contributes materially to the strength of the container, thus enabling high strength and highly attractive visual packaging assemblies wherein the window may constitute a large and even a dominant portion of the total surface area. By the present invention, the excess material at the fold of the plastic material is readily accommodated without injuring the fold in the window or the paperboard frame. Moreover, the blanks may be readily cold-folded into the assembled containers on high-speed packaging lines by the method of the present invention so as to permit economical usage and optimum versatility in application.

Although but several embodiments of the invention have been shown and described herein, it will be understood by those skilled in the art that modifications may be made without departing from the spirit of the invention.

Having thus described the invention, I claim:

1. A display container having a paperboard frame and a window of semi-rigid synthetic plastic sheet material having at least one substantially rectilinear fold therein, said paperboard frame overlapping parallel side margins of the plastic window normal to the direction of the fold in said window, said plastic window having opposed notches in its side margins at said fold and said paperboard frame having inwardly projecting finger portions extending in overlapping relationship beyond the margins of said notches to conceal the same from external view; and means adhesively bonding said plastic window and paperboard frame along the overlapping side margins and terminating adjacent to the notches and finger portions, the overlapping surfaces of the projecting finger portions and window adjacent the notches being free from bonding to permit relative slippage therebetween.

2. The container in accordance with claim 1 wherein said window has at least three rectilinear folds therein.

3. The container in accordance with claim 1 wherein said notches and finger portions are curvilinear in configuration.

4. The container in accordance with claim 1 wherein said adhesive is substantially continuous between adjacent finger portions.

5. The container in accordance with claim 1 wherein said synthetic plastic sheet material is biaxially oriented polystyrene of about 5 to 15 mils thickness.

6. A six-sided display container having an integrally formed paperboard frame and a window of semi-rigid synthetic plastic sheet material having at least one substantially rectilinear fold therein, said paperboard frame having panels therein defining the six sides of the container, said frame having an aperture therein generally conforming to the periphery of said window end of lesser dimension, said frame having marginal portions adjacent the aperture therein overlapping parallel side margins of the plastic window normal to the direction of the fold in said window, said plastic window having opposed notches in its side margins at said fold and said paperboard frame having inwardly projecting finger portions extending from the margins of the aperture in overlapping relationship beyond the margins of said notches to conceal the same from external view; and an interposed adhesive between and bonding said plastic window and paperboard frame along the overlapping side margins and terminating adjacent to the notches and finger portions, the overlapping surfaces of the projecting finger portions and window adjacent the notches being free from adhesive to permit relative slippage therebetween.

7. The container in accordance with claim 6 wherein said window has at least three substantially rectilinear folds therein and wherein said notches are curvilinear in configuration.

8. A six-sided display container having a paperboard frame and a window of semi-rigid synthetic plastic sheet material having at least one rectilinear fold therein, said paperboard frame having two spaced apart, separate cap portions each with panels therein defining four side wall portions and an end wall, said window having four folds therein to define four side wall panels, the opposed margins of the side wall portions of said cap portions overlapping the edges of said plastic window, said plastic window having opposed notches in its edges at said folds and said cap portions having inwardly projecting finger portions extending from the opposed margins thereof in overlapping relationship beyond the margins of said notches to conceal the same from external view; and an interposed adhesive between and bonding said plastic window and paperboard frame along the overlapping side margins but terminating adjacent to the notches and finger portions, the overlapping surfaces of the projecting finger portions and window adjacent the notches being free from adhesive to permit relative slippage therebetween.

9. A six-sided display container with a centrally disposed upright wall therein, said container having an integrally formed paperboard frame; an integrally formed window of semi-rigid synthetic plastic material, said window having rectilinear folds therein defining a top panel and an end panel and side wall panels extending at substantially right angles thereto, said frame having a top panel and end and side wall panels hingedly connected to said front panel and extending at substantially right angles thereto, said top panel, side panels and end panel having apertures therein configured generally similarly to the corresponding panels of said window and of somewhat lesser dimension to overlap opposed margins of said window panels at least at the folds thereof, said window having opposed notches in the margins thereof at the ends of said folds and said frame having projecting finger portions extending from the opposed margins of said apertures therein in overlapping relationship beyond the margins of said notches to conceal the same from external view, said frame having bottom panels hingedly connected to said side wall panels and extending at substantially right angles thereto inwardly of the container and upright panels hingedly connected to the inner ends of said bottom panels and extending generally vertically upwardly therefrom to provide a substantially upright wall centrally of the container, said frame also having locking panels hingedly connected to the ends of said front and rear panels and extending generally vertically inwardly therefrom in overlapping relationship with said bottom wall panels, said locking panels having notches therein receiving said upright wall; and an interposed adhesive between and bonding said plastic window and paperboard frame along the overlapping side margins but terminating adjacent to the notches and finger portions, the overlapping surfaces of the projecting finger portions and window adjacent the notches being free from adhesive to permit relative slippage therebetween.

10. The container of claim 9 wherein the front and side panels of said frame have generally U-shaped apertures therein providing upright columnar portions at the side margins and a connecting base portion and wherein said top panel of the frame has tab portions at the sides of its front edge hingedly connected with the adjacent upright columnar portions of the front and side panels and a strap portion extending across its rear edge and hingedly connected to said rear panel and the adjacent columnar portions of said side panels, said finger portions being formed in contiguous hinged portions of the tabs and upright columnar portions and of the strap and upright columnar portions.

11. A display container with a hanging card portion, said container having an integrally formed paperboard frame; an integrally formed window of semi-rigid synthetic plastic sheet material having substantially rectilinear folds therein defining a top panel, front panel and bottom panel, said paperboard frame having a top panel, front panel, bottom panel and an elongated rear panel providing a hanging card portion extending beyond the intersection therewith of the top panel, said frame having end closure and dust flaps hingedly connected to the outer side margins of said panels, said top, front and bottom panels having apertures therein generally configured similarly to the corresponding panels of said window and of lesser dimension to provide marginal portions overlapping parallel margins of the window normal to the directions of the folds therein, said plastic window having opposed notches in its side margins at said folds and said paperboard frame having inwardly projecting finger portions extending in overlapping relationship beyond the margins of said notches to conceal the same from external view; and an interposed adhesive between and bonding said plastic window and paperboard frame along the overlapping side margins and terminating adjacent to the notches and finger portions, the overlapping surfaces of the projecting finger portions and window adjacent the notches being free from adhesive to permit relative slippage therebetween.

12. The container of claim 11 wherein said window has a fold therein defining a rear panel and said rear panel of the frame has an aperture therein providing marginal portions overlapping the edges of said rear panel of said window.

13. A blank for a display container comprising a window of semi-rigid synthetic plastic sheet material, the surface of said window being smooth and unbroken; a frame of paperboard sheet material overlapping at least two opposed side margins of said window, said paperboard frame having weakening lines therein defining folds to be made in forming the container with at least one of said weakening lines intersecting the side margins of said window, said plastic window having notches in its opposed side margins at the intersections with said weakening line and said paperboard frame having projecting finger portions extending in overlapping relationship beyond the margins of said notches to conceal one surface thereof; and means adhesively bonding said plastic window and paperboard frame along the overlapping side margins but terminating adjacent to the notches and finger portions, the overlapping surfaces of the projecting finger portions and window about the notches being free from bonding to permit relative slippage therebetween.

14. The blank in accordance with claim 13 wherein said notches are curvilinear in configuration 15. The blank in accordance with claim 13 wherein said plastic sheet material is biaxially oriented polystyrene of about 5 to 15 mils thickness.

16. A blank for a six-sided display container comprising an integrally formed window of semi-rigid synthetic plastic sheet material, the surface of said window being smooth and unbroken; an integrally formed frame of paperboard sheet material having an aperture therein generally conforming to the periphery of said window and of lesser dimension, said frame having marginal portions adjacent the aperture therein overlapping the side margins of said window, said paperboard frame having weakening lines therein defining folds to be made in forming the container with at least one of said weakening lines intersecting the side margins of said window, said plastic window having notches in its opposed side margins at the intersection with said weakening line and said paperboard frame having projecting finger portions extending in overlapping relationship beyond the margins of said notches to conceal one surface thereof; and an adhesive interposed between and bonding said plastic window and paperboard frame along the overlapping side margins but terminating adjacent to the notches and finger portions, the overlapping surfaces of the projecting finger portions and window about the margins of the notches being free from adhesive to permit relative slippage therebetween.

17. A blank for a six-sided display container comprising an integrally formed window of semi-rigid synthetic plastic sheet material, the surface of said window being smooth and unbroken; a frame of paperboard sheet material comprising a pair of caps overlapping opposed side margins of said window and having hinged flaps thereon to form end walls for the container, said caps each having four aligned weakening lines therein defining folds to be made in forming the side walls of said container and intersecting the side margins of said plastic window, said plastic window having notches in its opposed side margins at the intersections with said weakening lines and said caps having projecting finger portions extending in overlapping relationship beyond the margins of said notches to conceal one surface thereof; and an adhesive interposed between and bonding said plastic window and paperboard frame along the overlapping side margins but terminating adjacent to the notches and finger portions, the overlapping surfaces of the projecting finger portions and window about the margins of the notches being free from adhesive to permit relative slippage therebetween.

References Cited by the Examiner
UNITED STATES PATENTS

| | | | |
|---|---|---|---|
| 2,143,957 | 1/39 | Petter | 206—45.34 |
| 2,297,987 | 10/42 | Ryerson | 206—45.31 |
| 2,337,654 | 12/43 | Goodyear | 206—45.31 |
| 2,746,360 | 5/56 | Bright | 93—36 |
| 2,844,300 | 7/58 | Guyer | 229—87 |
| 2,925,020 | 2/60 | Willett | 93—36 |
| 2,954,725 | 10/60 | Palmer | 93—51 |

THERON E. CONDON, *Primary Examiner.*

EARLE J. DRUMMOND, *Examiner.*